United States Patent
Lee et al.

(10) Patent No.: US 12,529,729 B2
(45) Date of Patent: Jan. 20, 2026

(54) APPARATUS AND METHOD FOR ESTIMATING STATE OF CHARGE OF BATTERY ON BASIS OF COULOMB COUNTER

(71) Applicants: Silicon Mitus, Inc.; SILICON-MAGIC SEMICONDUCTOR TECHNOLOGY (HANGZHOU) CO., LTD., Hangzhou (CN)

(72) Inventors: Sang Woo Lee, Yongin-si (KR); Dae Sun Kim, Seoul (KR); Gi Chur Bae, Seoul (KR)

(73) Assignees: Silicon Mitus, Inc., Gyeonggi-do (KR); SILICON-MAGIC SEMICONDUCTOR TECHNOLOGY (HANGZHOU) CO., LTD., Hangzhou (CN)

(*) Notice: Subject to any disclaimer, the term of this patent is extended or adjusted under 35 U.S.C. 154(b) by 320 days.

(21) Appl. No.: 17/916,409

(22) PCT Filed: May 7, 2021

(86) PCT No.: PCT/KR2021/005739
§ 371 (c)(1),
(2) Date: Sep. 30, 2022

(87) PCT Pub. No.: WO2021/230579
PCT Pub. Date: Nov. 18, 2021

(65) Prior Publication Data
US 2023/0152381 A1    May 18, 2023

(30) Foreign Application Priority Data
May 11, 2020  (KR) .................. 10-2020-0056024

(51) Int. Cl.
*G06F 11/30*    (2006.01)
*G01R 31/367*    (2019.01)
(Continued)

(52) U.S. Cl.
CPC ....... *G01R 31/3842* (2019.01); *G01R 31/367* (2019.01); *G01R 31/389* (2019.01); *G01R 31/392* (2019.01)

(58) Field of Classification Search
CPC ................................................ G01R 31/3842
See application file for complete search history.

(56) References Cited

U.S. PATENT DOCUMENTS 8,264,203 B2 * 9/2012 Darilek .............. G01R 31/3828
                                                    320/132
10,408,887 B2 * 9/2019 Shimizu ................ G01R 31/392
(Continued)

FOREIGN PATENT DOCUMENTS

KR       100962856 B1 *  6/2010
KR     20160110221 A  *  9/2016

*Primary Examiner* — Phuong Huynh
(74) *Attorney, Agent, or Firm* — Osha Bergman Watanabe & Burton LLP (57) ABSTRACT

Embodiments of the present disclosure includes an apparatus for estimating the state of charge of a battery, comprising: a first coulomb counter (STCC) for sampling a first charge variation ($\Delta Q$) on the battery in a time comprising a number of predetermined periods, by adding up a battery current Im in each of the predetermined periods; a compensator for calculating a second charge variation ($\Delta Q\_comp$) by compensating for the first charge variation ($\Delta Q$); a second coulomb counter (CCE) for calculating a first predicted charge amount (Qe) by adding up the second charge variation ($\Delta Q\_comp$); and a state of charge estimator for estimating the state of charge of the battery on the basis of the first predicted charge amount (Qe). The technique increases
(Continued)

the accuracy of a state of charge estimation by compensating for characteristics according to battery temperature and aging.

19 Claims, 7 Drawing Sheets

(51) Int. Cl.
*G01R 31/3842* (2019.01)
*G01R 31/389* (2019.01)
*G01R 31/392* (2019.01)

(56) References Cited

U.S. PATENT DOCUMENTS

| | | | |
|---|---|---|---|
| 2016/0266211 A1* | 9/2016 | Imaizumi | G01R 31/389 |
| 2018/0252775 A1* | 9/2018 | Wu | H01M 10/48 |

* cited by examiner

APPARATUS AND METHOD FOR ESTIMATING STATE OF CHARGE OF BATTERY ON BASIS OF COULOMB COUNTER

TECHNICAL FIELD

The present invention relates to an apparatus and a method for estimating a state of charge of a battery on the basis of a coulomb counter. Specifically, the present invention relates to the apparatus and the method capable of reducing a state of charge estimation error caused by error accumulation in a current detection in the coulomb counter-based estimation of the state of charge of the battery, and increasing the accuracy of a state of charge estimation by compensating for characteristics according to battery temperature and aging.

BACKGROUND ART

The coulomb counter-based technology is widely used to estimate the state of charge of the battery. In the technology for estimating the state of charge of the battery on the basis of the coulomb counter, a battery current may be detected and an amount of charge of the battery may be estimated by adding up the detected battery current, and the state of charge of the battery may be estimated on the basis of the estimated amount of charge of the battery. The technology for estimating the state of charge of the battery on the basis of the coulomb counter is also known as a current integration method, and is widely used due to the advantage of enabling a relatively accurate state of charge estimation with a simple method.

However, since the general technology for estimating the state of charge of the battery on the basis of the coulomb counter is a method of predicting an amount of residual charge of the battery by continuously accumulating and summing the measured currents, even if there is a slight error in the measured current, etc., there can be a possibility that a significant error may occur in the predicting the amount of residual charge of the battery when the error is accumulated and time elapses.

In addition, the general technology for estimating the state of charge of the battery on the basis of the coulomb counter also has room for improvement in that it does not reflect a change in battery characteristics according to battery temperature and aging. For example, if the battery is in a low temperature state or its aging progresses, a full charge capacity (or available capacity) of the battery may be significantly reduced compared to its design capacity. When such a reduction in the full charge capacity is not reflected, the accuracy of the state of charge estimation may be lowered.

SUMMARY OF THE DISCLOSURE

According to an embodiment, the present invention intends to improve a problem that the accuracy of the state of charge estimation is deteriorated due to the error accumulation in current measurements, etc. in the coulomb counter-based estimation of the state of charge of the battery.

According to an embodiment, the present invention intends to increase the accuracy of the state of charge estimation by reflecting a change in battery characteristics according to battery temperature and aging in the coulomb counter-based estimation of the state of charge of the battery.

According to an embodiment, the present invention intends to estimate the state of charge of the battery on the basis of the full charge capacity changed according to battery temperature and aging in the coulomb counter-based estimation of the state of charge of the battery.

According to an embodiment, the present invention intends to simplify the structure and reduce power consumption used for the state of charge estimation in the coulomb counter-based estimation of the state of charge of the battery.

Technical Solution

One aspect of the present invention is an apparatus for estimating a state of charge of a battery including a first coulomb counter (STCC) for calculating a first charge variation $\Delta Q$ in each period by adding up a battery current Im in each predetermined period, a compensator for calculating a second charge variation $\Delta Q\_comp$ by compensating for the first charge variation $\Delta Q$, a second coulomb counter CCE for calculating a first predicted charge amount Qe by adding up the second charge variation $\Delta Q\_comp$, and a state of charge estimator for estimating the state of charge of the battery on the basis of the first predicted charge amount Qe.

In the apparatus for estimating the state of charge of the battery, the compensator may calculate a predicted open circuit voltage OCVe using the first predicted charge amount Qe, and calculate the second charge variation $\Delta Q\_comp$ using the predicted open circuit voltage OCVe.

In the apparatus for estimating the state of charge of the battery, a first lookup table LUT1 including data on a relationship between an open circuit voltage OCV and a charge amount Q of the battery may be used when the predicted open circuit voltage OCVe is calculated using the first predicted charge amount Qe.

In the apparatus for estimating the state of charge of the battery, the compensator may calculate the second charge variation $\Delta Q\_comp$ by compensating for the first charge variation $\Delta Q$ so that a difference between the predicted open circuit voltage OCVe and a battery terminal voltage Vm decreases when a magnitude of the battery current Im is less than a first threshold value.

In the apparatus for estimating the state of charge of the battery, the second charge variation $\Delta Q\_comp$ may be calculated on the basis of a parameter obtained by multiplying a value, which is obtained by subtracting the predicted open circuit voltage OCVe from the battery terminal voltage Vm, by a first constant C1.

In the apparatus for estimating the state of charge of the battery, the first constant C1 may be predetermined on the basis of an internal resistance value of the battery.

In the apparatus for estimating the state of charge of the battery, the compensator may calculate the second charge variation $\Delta Q\_comp$ by compensating for the first charge variation $\Delta Q$ so that a difference between a first overpotential predicted value Vds_e and a first overpotential reference value Vds_ref decreases when a magnitude of the battery current Im is greater than a second threshold value.

In the apparatus for estimating the state of charge of the battery, the first overpotential predicted value Vds_e may be calculated on the basis of a value obtained by subtracting the predicted open circuit voltage OCVe from the battery terminal voltage Vm, and the first overpotential reference value Vds_ref may be calculated using a second lookup table LUT2 including information about an internal resistance R and a second overpotential Vov of the battery.

In the apparatus for estimating the state of charge of the battery, the information about the internal resistance R and the second overpotential Vov of the battery included in the second lookup table LUT2 may be data obtained through an experiment of applying an intermittent constant current pulse at room temperature to an unaged battery.

In the apparatus for estimating the state of charge of the battery, the compensator may calculate a charge variation compensation coefficient comp_rate, and calculate the second charge variation $\Delta Q\_comp$ by multiplying the charge variation compensation coefficient comp_rate by the first charge variation $\Delta Q$.

In the apparatus for estimating the state of charge of the battery, when the first overpotential predicted value Vds_e is less than the first overpotential reference value Vds_ref, the charge variation compensation coefficient comp_rate may be set to 1.

In the apparatus for estimating the state of charge of the battery, when the first overpotential predicted value Vds_e is greater than the first overpotential reference value Vds_ref, as a first overpotential rate Vds_rate increases, the charge variation compensation coefficient comp_rate may also increase.

In the apparatus for estimating the state of charge of the battery, the first overpotential rate Vds_rate may be proportional to a value obtained by dividing the first overpotential predicted value Vds_e by the first overpotential reference value Vds_ref.

In the apparatus for estimating the state of charge of the battery, when the first overpotential predicted value Vds_e is greater than the first overpotential reference value Vds_ref, as a charge change rate Qm_rate increases, the charge variation compensation coefficient comp_rate may also increase.

In the apparatus for estimating the state of charge of the battery, the compensator may further include a third coulomb counter CCM for calculating a second predicted charge amount Qm by adding up the first charge variation $\Delta Q$, and the charge change rate Qm_rate may be determined on the basis of a change rate of the second predicted charge amount Qm.

Another aspect of the present invention is a method for estimating a state of charge of a battery performed by an apparatus for estimating the state of charge of the battery, the method including calculating a first charge variation $\Delta Q$ by adding up a battery current Im, calculating a second charge variation $\Delta Q\_comp$ by compensating for the first charge variation $\Delta Q$, calculating a first predicted charge amount Qe by adding up the second charge variation $\Delta Q\_comp$, and estimating the state of charge of the battery on the basis of the first predicted charge amount Qe.

In the method for estimating the state of charge of the battery, in the calculating of the second charge variation $\Delta Q\_comp$ by compensating for the first charge variation $\Delta Q$, a predicted open circuit voltage OCVe may be calculated using the first predicted charge amount Qe, and the second charge variation $\Delta Q\_comp$ may be calculated by compensating for the first charge variation $\Delta Q$ using the predicted open circuit voltage OCVe.

In the method for estimating the state of charge of the battery, in the calculating of the second charge variation $\Delta Q\_comp$ by compensating for the first charge variation $\Delta Q$, the second charge variation $\Delta Q\_comp$ may be calculated by compensating for the first charge variation $\Delta Q$ so that a difference between the predicted open circuit voltage OCVe and a battery terminal voltage Vm decreases when a magnitude of the battery current Im is less than a first threshold value.

In the method for estimating the state of charge of the battery, the second charge variation $\Delta Q\_comp$ may be calculated on the basis of a parameter obtained by multiplying a value, which is obtained by subtracting the predicted open circuit voltage OCVe from the battery terminal voltage Vm, by a first constant C1.

In the method for estimating the state of charge of the battery, in the calculating of the second charge variation $\Delta Q\_comp$ by compensating for the first charge variation $\Delta Q$, the second charge variation $\Delta Q\_comp$ may be calculated by compensating for the first charge variation $\Delta Q$ so that a difference between a first overpotential predicted value Vds_e and a first overpotential reference value Vds_ref decreases when a magnitude of the battery current Im is greater than a second threshold value.

Advantageous Effects

In the present invention, according to an embodiment, it is possible to improve a problem that the accuracy of the state of charge estimation is deteriorated due to the error accumulation in current measurements, etc. in the coulomb counter-based estimation of the state of charge of the battery.

In the present invention, according to an embodiment, it is possible to increase the accuracy of the state of charge estimation by reflecting a change in battery characteristics according to battery temperature and aging in the coulomb counter-based estimation of the state of charge of the battery.

In the present invention, according to an embodiment, it is possible to estimate the state of charge of the battery on the basis of the full charge capacity changed according to battery temperature and aging in the coulomb counter-based estimation of the state of charge of the battery.

In the present invention, according to an embodiment, it is possible to simplify the structure and reduce power consumption used for the state of charge estimation in the estimation of the state of charge of a battery on the basis of a coulomb counter.

EMBODIMENTS OF THE DISCLOSURE

Hereinafter, some embodiments of the present invention will be described in detail with reference to exemplary drawings. In adding reference numerals to components of each drawing, it should be noted that the same components are given the same reference numerals as much as possible even though the same components are displayed on different drawings. In addition, in describing the present invention, when it is determined that a detailed description of a related known configuration or function may obscure the gist of the present invention, the detailed description thereof will be omitted.

In addition, in describing the components of the present invention, terms such as first, second, A, B, (a), (b), etc. may be used. These terms are only for distinguishing the component from other components, and the nature, sequence, or order of the component is not limited by the term. When a component is described as "connected", "coupled" or "joined" to another element, the component may be directly connected or joined to the other component, but it should be understood that another component may be "connected", "coupled" or "joined" between respective components.

Figure 1:
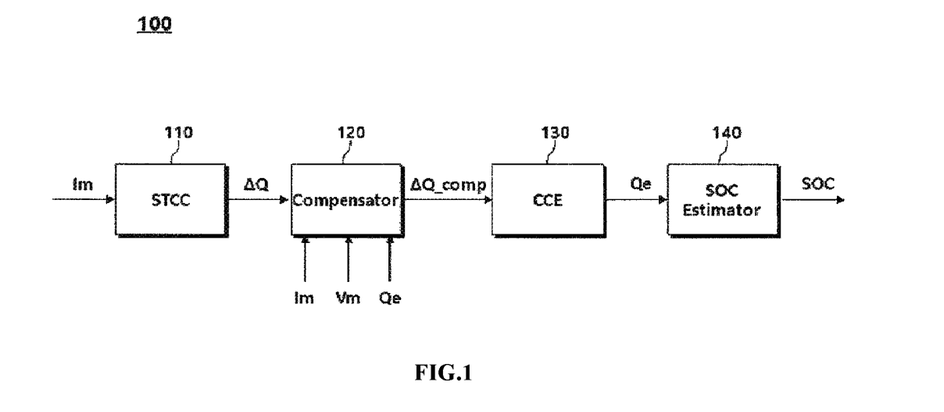
FIG. 1 illustrates an apparatus for estimating a state of charge of a battery according to an embodiment of the present invention.

FIG. 1 illustrates an apparatus 100 for estimating a state of charge of a battery according to an embodiment of the present invention.

Referring to FIG. 1, the apparatus 100 for estimating the state of charge of the battery may include a first coulomb counter (STCC) 110, a compensator 120, a second coulomb counter (CCE) 130, and a state of charge (SOC) estimator 140.

The apparatus 100 for estimating the state of charge of the battery may be used to estimate the state of charge of a battery in various equipment using the battery. For example, the apparatus 100 for estimating the state of charge of the battery may have high utility in portable electronic equipment such as mobile phones, tablets, and notebooks, but the use of the apparatus 100 for estimating the state of charge of the battery is not limited thereto. The apparatus 100 for estimating the state of charge of the battery may be implemented in various ways, such as being implemented as a separate device in various equipment using batteries, or as a single functional element in another device (e.g., controller, etc.) originally installed in the equipment.

The first coulomb counter 110 may calculate a first charge variation ΔQ in each period by adding up a battery current Im in each predetermined period.

The battery current Im may be a value obtained by detecting a current for charging or discharging a battery. A conventional current detection means may be used to detect the battery current Im. For example, a current sensing resistor or a current transformer may be used, but is not limited thereto. Although a detection means of the battery current Im may be a component included in the apparatus 100 for estimating the state of charge of the battery, the apparatus 100 for estimating the state of charge of the battery may acquire information of the battery current Im from an external detection means of battery current Im.

The first coulomb counter 110 may perform an adding up function for each period of the battery current Im. That is, the first coulomb counter 110 may operate in a manner that repeats process of adding upthe battery current Im in each predetermined period to calculate the first charge variation ΔQ, then being initialized, and adding up; the battery current Im in a predetermined period again. For example, the first coulomb counter 110 may calculate the first charge variation ΔQ by accumulating and summing a predetermined number of pieces of digitized sampling data of the battery current. In this case, a value obtained by multiplying a sampling period of the battery current Im by the number of pieces of data added up may be understood as an adding up period of the first coulomb counter 110.

The reason why the first coulomb counter 110 performs the adding up function for each cycle will be described. As will be described in detail later, in this embodiment, after the second charge variation ΔQ_comp is calculated by compensating for the first charge variation ΔQ through the compensator 120, the second coulomb counter 130 may calculate the first predicted charge amount Qe by adding up the second charge variation ΔQ_comp. When the first coulomb counter 110 is not used, the compensator 120 should perform a compensation operation for each of the sampled battery currents Im. In this case, when noise is included in each sampled battery current Im, an operation of the compensator 120 may not be smooth, and power consumption may increase as the number of operations of the compensator 120 increases. In this embodiment, the first charge variation ΔQ in each period is generated by adding up the battery current Im in each predetermined period using the first coulomb counter 110, and the compensator 120 may perform a compensation operation on the first charge variation ΔQ in each period. In this case, since the first charge variation ΔQ is obtained by integrating a plurality of battery current Im sampling values, the influence of noise is reduced and the operation frequency of the compensator 120 is reduced, and thus there is an advantage in that power consumption is reduced.

In this case, the adding up period of the first coulomb counter 110 is preferably set to such an extent that changes in the battery state, such as the battery current Im, the battery voltage Vm, and the state of charge SOC, are not large. This is because, when the adding up period of the first coulomb counter is set to be long enough that the change in the battery state is significant, it may not be easy for the compensator 120 to perform an appropriate compensation function for the first charge variation ΔQ due to the change in the battery state. For example, when the battery current Im is sampled through an analog-digital converter (ADC) with a period of about 0.3 seconds and the first coulomb counter 110 is set to add up 4 to 8 sampled battery currents Im, the accuracy of the state of charge estimation can be increased by appropriately compensating for the first charge variation ΔQ while reducing the influence of noise and power consumption.

The compensator 120 may calculate the second charge variation ΔQ_comp by compensating for the first charge variation ΔQ. According to the embodiment, the compensator 120 may calculate the second charge variation ΔQ_comp by compensating for the first charge variation ΔQ using the battery current Im, the battery terminal voltage Vm, and a first predicted charge amount Qe. According to the embodiment, the compensator 120 may calculate a predicted open circuit voltage OCVe using the first predicted charge amount Qe, and calculate the second charge variation ΔQ_comp by compensating for the first charge variation ΔQ using the predicted open circuit voltage OCVe. The compensator 120 will be described in more detail below.

The second coulomb counter (CCE) 130 may calculate the first predicted charge amount Qe by adding up the second charge variation ΔQ_comp. If the first coulomb counter 110 performs the adding up function for each period, it may be understood that the second coulomb counter 130 does not have a particular period and accumulates and sums the battery current Im. When comparing to a general current adding up method, there is a difference in that the second coulomb counter 130 does not add up the battery current Im as it is, but adds up the second charge variation ΔQ_comp, which is a value compensated by the compensator 120.

The state of charge estimator (SOC) 140 may estimate the state of charge of the battery on the basis of the first predicted charge amount Qe. According to an embodiment, the state of charge of the battery output by the state of charge estimator 140 may be a state of charge (SOC), but is not limited thereto. For example, the state of charge of the battery may be a value corresponding to a value obtained by dividing the first predicted charge amount Qe by a design capacity of the battery.

Figure 2:
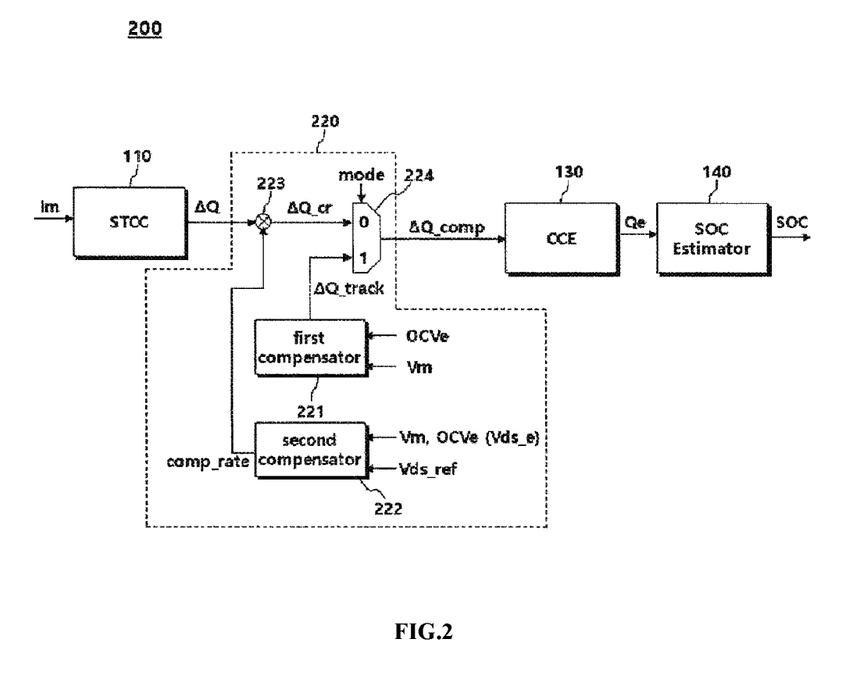
FIG. 2 illustrates an apparatus for estimating a state of charge of a battery according to another embodiment of the present invention.

FIG. 2 illustrates an apparatus 200 for estimating a state of charge of a battery according to another embodiment of the present invention.

Referring to FIG. 2, the apparatus 200 for estimating the state of charge of the battery may include the first coulomb counter 110, a compensator 220, the second coulomb counter 130, and a state of charge estimator 140. The first coulomb counter 110, the second coulomb counter 130, and the state of charge estimator 140 may operate similarly to those described with reference to FIG. 1, unless they are contrary to the contents described below.

The compensator 220 may include a first compensator 221, a second compensator 222, a multiplier 223, and a multiplexer 224.

The first compensator 221 may operate to eliminate an accumulated error of the first predicted charge amount Qe when the battery is in a relaxation state.

To this end, according to the embodiment, the first compensator 221 may calculate the second charge variation ΔQ_comp by compensating for the first charge variation ΔQ so that a difference between the predicted open circuit voltage OCVe and the battery terminal voltage Vm decreases when a magnitude of the battery current Im is less than a first threshold value. According to the embodiment, the magnitude of the battery current Im may be an average of absolute values of the battery current Im during the adding up period of the first coulomb counter 110, but is not limited thereto. In addition, according to an embodiment, the first compensator 221 may be set to operate only when the determination that the magnitude of the battery current Im is less than the first threshold vaue continues for a predetermined number of times or more. The first threshold value may be set to a value sufficient to determine that the battery is in the relaxation state to some extent.

When the battery is in a sufficiently relaxation state, the battery terminal voltage Vm may be substantially equal to an actual open circuit voltage OCV of the battery. In this embodiment, since an equivalent model of the battery is not used, an attempt is not made to accurately estimate the actual open circuit voltage OCV of the battery. The predicted open circuit voltage OCVe in this embodiment is a value simply calculated from the first predicted charge amount Qe through a lookup table, etc., as will be described later, and it is assumed that the predicted open circuit voltage OCVe will be different from the actual open circuit voltage OCV to some extent. In this embodiment, under this recognition, under the assumption that the battery terminal voltage Vm will be more similar to the actual open circuit voltage OCV than the predicted open circuit voltage OCVe when the magnitude of the battery current Im is less than the first threshold, the accumulated error of the first predicted charge amount Qe can be eliminated by compensating for the first charge variation ΔQ so that the predicted open circuit voltage OCVe tracks the battery terminal voltage Vm to calculate the second charge variation ΔQ_comp.

When a state in which the battery current Im is less than the first threshold value continues for a long period of time (e.g., several hours), the battery is in a sufficiently relaxed state, and only when this state is reached, the battery terminal voltage Vm will be substantially equal to the actual open circuit voltage OCV. However, in this embodiment, when the battery current becomes less than the first threshold, even if a sufficient time has not elapsed, it is assumed that the battery terminal voltage Vm is similar to the actual open circuit voltage OCV, and the battery may operate such that the predicted open circuit voltage OCVe tracks the battery terminal voltage Vm.

According to this embodiment, when the accumulation error of the first predicted charge amount Qe increases during the battery operation (even if the battery is not relaxed enough), the accumulation error can be reduced, and when the battery is sufficiently relaxed, the error of the first predicted charge amount Qe can be almost eliminated automatically by the same algorithm. As described above, according to the present embodiment, it is possible to increase the accuracy of estimating the state of charge of the battery by preventing the error of the first predicted charge amount Qe from being accumulated with a simple way without using a complex system for accurately estimating the actual open circuit voltage OCV using a battery equivalent model, etc.

According to an embodiment, as shown in Equation 1 below, the second charge variation ΔQ_comp may be calculated on the basis of a parameter obtained by multiplying a value, which is obtained by subtracting the predicted open circuit voltage OCVe from the battery terminal voltage Vm, by a first constant C1.

$$\Delta Q\_comp = (Vm - OCVe) \cdot C1 \quad \text{[Equation 1]}$$

Here, the first constant C1 is a constant that affects the speed at which the predicted open circuit voltage OCVe tracks the battery terminal voltage Vm, and may be determined on the basis of the internal resistance value of the battery.

Equation 1 illustrates a case in which the second charge variation ΔQ_comp is determined independently of the first charge variation ΔQ, but unlike this, the second charge variation ΔQ_comp may be set such that the predicted open circuit voltage OCVe tracks the battery terminal voltage Vm while being affected by the first charge variation ΔQ.

As such, when the magnitude of the battery current Im is less than the first threshold value (even if the battery is not sufficiently relaxed), the first compensator 221 causes the predicted open circuit voltage OCVe to track the battery terminal voltage Vm, thereby capable of preventing the error of the first predicted charge amount Qe from being accumulated.

The second compensator 222 may estimate the state of charge by reflecting the full charge capacity that varies depending on battery temperature and aging by using a first overpotential Vds in a situation where charge and discharge current flows through the battery.

First, to describe overpotential, when a current flows through an electrode in an equilibrium state, the electrode potential deviates from the equilibrium potential, and the degree of deviation can be referred to as the overpotential. The overpotential may be understood as a combination of the effects of the internal resistance of the battery and other effects (slow electrochemical reaction of the electrolyte, diffusion rate, non-uniformity of current distribution, etc.). In this specification, the total overpotential, which is a combination of the effect of the internal resistance of the battery and other effects, is referred to as a first overpotential Vds, and overpotential caused by other effects excluding the internal resistance of the battery is referred to as a second overpotential Vov. That is, as shown in Equation 2, the first overpotential Vds may be understood as the sum of the voltage due to the internal resistance and the second overpotential Vov.

$$Vds = Im \cdot R + Vov \qquad \text{[Equation 2]}$$

The first overpotential Vds may be calculated using the internal resistance and the second overpotential Vov of the battery as in Equation 2, but may be calculated using a difference between the terminal voltage Vm of the battery and the open circuit voltage OCV of the battery as shown in Equation 3 according to circumstances.

$$Vds = Vm - OCV \qquad \text{[Equation 3]}$$

According to an embodiment, the second compensator 222 may calculate the second charge variation ΔQ_comp by compensating for the first charge variation ΔQ so that a difference between the first overpotential predicted value Vds_e and the first overpotential reference value Vds_ref decreases when the magnitude of the battery current Im is greater than a second threshold value.

The magnitude of the battery current Im may be an average of absolute values of the battery current Im during the adding up period of the first coulomb counter 110, but is not limited thereto. In addition, according to an embodiment, the second compensator 222 may be set to operate only when the determination that the magnitude of the battery current Im is greater than the second threshold continues for a predetermined number of times or more. The second threshold value may be set to a value sufficient to determine that the battery is in a charge or discharge operation state.

The first overpotential reference value Vds_ref is a reference value for the first overpotential, and may be a value previously measured at room temperature with respect to a reference battery (e.g., a new battery or battery in an unaged state). According to an embodiment, the first overpotential reference value Vds_ref may be calculated using internal resistance previously measured at room temperature with respect to the reference battery and the second overpotential Vov. Equation 2 may be used when calculating the first overpotential reference value Vds_ref using the internal resistance and the second overpotential Vov.

The first overpotential predicted value Vds_e is a value calculated during the operation of the apparatus 200 for estimating the state of charge of the battery, and may be calculated on the basis of a value obtained by subtracting the predicted open circuit voltage OCVe from the battery terminal voltage Vm as shown in Equation (4), according to an embodiment.

$$Vds\_e = Vm - OCVe \qquad \text{[Equation 4]}$$

That is, the first predicted overpotential value Vds_e is a value calculated using the detected battery terminal voltage Vm and the predicted open circuit voltage OCVe, and may be understood as the first overpotential currently predicted by the apparatus 200 for estimating the state of charge of the battery.

When the first predicted overpotential value Vds_e is greater than the first overpotential reference value Vds_ref, there is a possibility that the full charge capacity of the current battery has decreased compared to the design capacity due to low temperature, aging, etc. In this case, the second compensator 222 calculates the second charge variation ΔQ_comp by compensating for the first charge variation ΔQ in a direction in which the first overpotential predicted value Vds_e tracks the first overpotential reference value Vds_ref, thereby capable of estimating the state of charge by reflecting the change in the full charge capacity.

When the temperature is low or the battery is aging, the first overpotential Vds increases compared to the battery in the reference state, while the full charge capacity (available capacity) of the battery decreases. When the state of charge is calculated without reflecting the characteristics of a decrease in the full charge capacity due to battery temperature or aging, the accuracy of the calculated charging state may be reduced. For example, when the full charge capacity of the battery is reduced to 50% of the design capacity due to low temperature, etc., even if the battery is charged to 100% of its full charge capacity, the SOC calculated on the basis of the design capacity may be calculated as 50%. As such, when the state of charge is calculated on the basis of the design capacity without taking into account the change in the full charge capacity due to temperature or aging, and the result is provided to the user, it may cause confusion to the user.

In this embodiment, in order to prevent such a problem from occurring, the state of charge may be calculated by reflecting the change in the full charge capacity according to temperature or aging. For example, when the full charge capacity is reduced due to the low temperature or the progress of aging of the battery, the second charge variation ΔQ_comp is made greater than the first charge variation ΔQ by increasing the charge variation compensation coefficient comp_rate, so that the first predicted charge amount Qe that is the output of the second coulomb counter 130 can be made to have a larger value. In this case, since the SOC, which is a value obtained by dividing the first predicted charge amount Qe by the design capacity, has a larger value, the decrease in the full charge capacity can be effectively reflected. That is, in the case of the prior art, a problem that the estimated SOC does not approach 0% or 100% may occur when the full charge capacity is reduced according to the temperature or aging, but according to the present embodiment, such a problem can be solved.

According to an embodiment, as a first overpotential rate Vds_rate, which is a ratio of the first overpotential predicted value Vds_e to the first overpotential reference value Vds_ref, increases, the charge variation compensation coefficient comp_rate may be increased. An increase in the first overpotential rate Vds_rate means that the first predicted overpotential value Vds_e increases compared to the first overpotential reference value Vds_ref, which may be understood that the decrease in the full charge capacity according to the temperature or aging is intensified. In this case, the change in the full charge capacity can be more effectively reflected by increasing the degree of increase of the first predicted charge amount Qe by increasing the charge variation compensation coefficient comp_rate.

The multiplier 223 may calculate a third charge variation ΔQ_cr by multiplying the first charge variation ΔQ by the charge variation compensation coefficient comp_rate, which is the output of the second compensator 222.

The multiplexer 224 may output a value selected according to a mode among a fourth charge variation ΔQ track that is an output of the first compensator 221 and the third charge variation ΔQ_cr generated by the second compensator 222. To this end, the multiplexer 224 may receive a mode selection signal mode from a controller (not illustrated), etc., and output a value selected according to the mode selection signal mode among the third charge variation ΔQ_cr and the fourth charge variation ΔQ track as the second charge variation ΔQ_comp. For example, as in Equation 5, when the mode selection signal mode is '0', the multiplexer 224 outputs the third charge variation ΔQ_cr, and when the mode selection signal mode is '1', the multiplexer 224 may output the fourth charge variation ΔQ track. That is, the multiplexer 224 may cause the first compensator 221 and the second compensator 222 to selectively operate according to the mode selection signal mode.

$$\Delta Q\_comp = \begin{cases} \Delta Q\_cr, & \text{if mode} = 0 \\ \Delta Q\_track, & \text{if mode} = 1 \end{cases} \quad \text{[Equation 5]}$$

Meanwhile, in FIG. 2, although the case of using the first compensator 221 and the second compensator 222 together is exemplified, only one of the first compensator 221 and the second compensator 222 may be selectively used in the apparatus 200 for estimating the state of charge of the battery. In this case, the multiplexer 224 may be omitted or used for selecting whether or not to operate the corresponding controller.

In addition, the first threshold value used to determine whether or not the first compensator 221 is operated and the second threshold value used to determine whether or not the second compensator 222 is operated may be the same value. In this case, when the magnitude of the battery current Im is less than the first threshold value (or second threshold value), the first compensator 221 may operate, and when the magnitude of the battery current Im is greater than the first threshold value (or second threshold value), the second compensator 222 may operate. Alternatively, according to an embodiment, the second threshold value may have a value greater than the first threshold value. In this case, when the magnitude of the battery current Im is less than the first threshold value, the first compensator 221 may operate, when the magnitude of the battery current Im is greater than the first threshold and less than the second threshold, neither of the first compensator 221 and the second compensator 222 may operate, and when the magnitude of the battery current Im is greater than the second threshold value, the second compensator 222 may operate.

Figure 3:
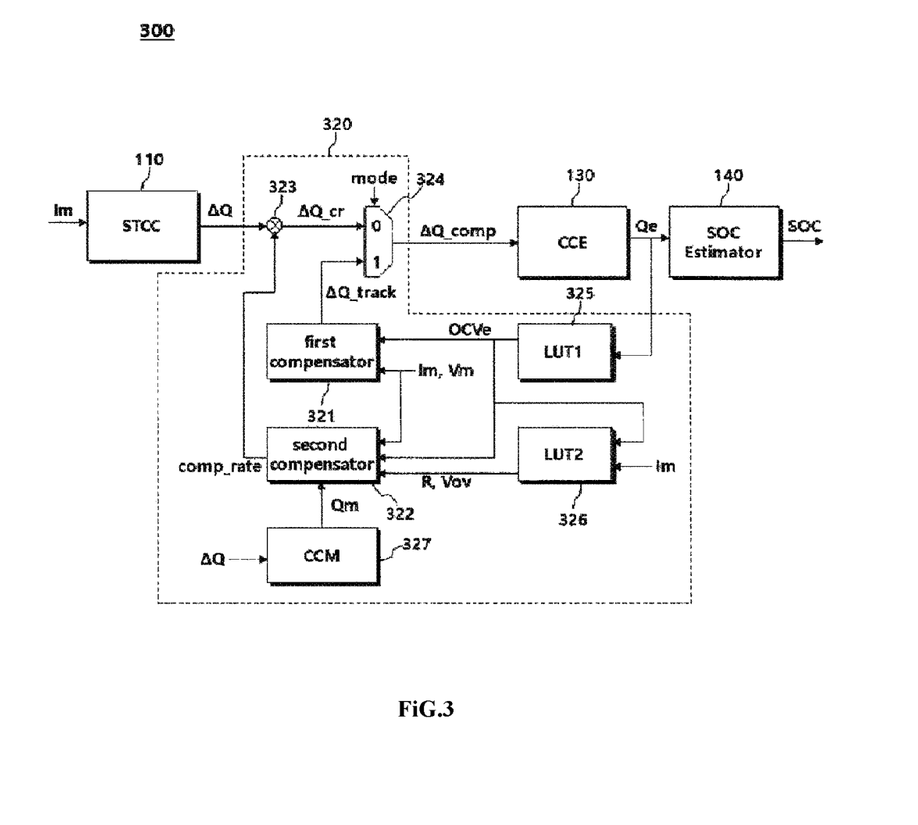
FIG. 3 illustrates an apparatus for estimating a state of charge of a battery according to still another embodiment of the present invention.

FIG. 3 illustrates an apparatus 300 for estimating a state of charge of a battery according to still another embodiment of the present invention.

Referring to FIG. 3, the apparatus 300 for estimating the state of charge of the battery may include the first coulomb counter 110, a compensator 320, the second coulomb counter 130, and the state of charge estimator 140. The compensator 320 may include a first compensator 321, a second compensator 322, a multiplier 323, a multiplexer 324, a first lookup table (LUT1) 325, a second lookup table (LUT2) 326, and a third coulomb counter (CCM)) 327. The first coulomb counter 110, the second coulomb counter 130 and the state of charge estimator 140 may operate similarly to those described with reference to FIGS. 1 and 2, unless they are contrary to the contents described below. In addition, the first compensator 321, the second compensator 322, the multiplier 323 and the multiplexer 324 included in the compensator 320 may operate similarly to those described with reference to FIG. 2, unless they are contrary to the contents described below.

The first lookup table (LUT1) 325 may include data on a relationship between the open circuit voltage OCV and an amount of charge Q of the battery. The compensator 320 may calculate the predicted open circuit voltage OCVe on the basis of the first predicted charge amount Qe using the first lookup table 325. The predicted open circuit voltage OCVe calculated using the first lookup table 325 may be utilized by the first compensator 321 and the second compensator 322 as described above.

The second lookup table (LUT2) 326 may include data on an internal resistance R and the second overpotential Vov of the battery according to the open circuit voltage OCV and the battery current Im. The compensator 320 may extract information about the internal resistance R and the second overpotential of the reference battery on the basis of the predicted open circuit voltage OCVe and the battery current Im using the second lookup table 326, and calculate the first overpotential reference value Vds_ref therefrom. According to an embodiment, the first overpotential reference value Vds_ref may be calculated by adding the second overpotential Vov to a value obtained by multiplying the battery current Im by the internal resistance R of the battery. As such, the compensator 320 may calculate the first overpotential reference value Vds_ref using the second lookup table 326 including information about the internal resistance R and the second overpotential Vov of the battery.

Data on the internal resistance R and the second overpotential Vov of the battery included in the second lookup table 326 can be obtained through an experiment in which an intermittent constant current pulse is applied at room temperature to a battery in an unaged state (reference battery). In this case, there is an advantage in that data on the internal resistance R and the second overpotential Vov of the battery can be obtained through a simple experiment.

The data on the internal resistance R and/or the second overpotential Vov of the battery may vary depending on the magnitude of the battery current Im, and it is difficult to store all data on the internal resistance R and/or the second overpotential Vov of the battery according to the magnitude of various battery currents Im in the second lookup table 326, and thus, data on the internal resistance R and/or the second overpotential Vov of the battery may be calculated by using a curve fitting function after storing data on a predetermined battery current in the second lookup table 256.

The third coulomb counter (CCM) 327 may calculate the second predicted charge amount Qm by adding up the first charge variation ΔQ. Unlike the second coulomb counter 130, the third coulomb counter 327 may add up the first charge variation ΔQ in an uncompensated state as it is.

As mentioned as a problem in the prior art, the accumulated error may be included in the second predicted charge quantity Qm, which is the output of the third coulomb counter 327. However, in the second compensator 322, as will be described later, instead of estimating the state of charge using the second predicted charge amount Qm, the rate of change of charge Qm_rate is extracted and used to calculate the charge variation compensation coefficient comp_rate, and thus the accumulation error included in the second predicted charge amount Qm is not a problem. On the other hand, since the first predicted charge amount Qe, which is the output of the second coulomb counter 130, is calculated by adding up the second charge variation ΔQ_comp, the first predicted charge amount Qe may be abruptly changed by the operation of the first compensator 321 or the second compensator 322. In contrast, since the second predicted charge amount Qm is calculated by adding up the first charge variation ΔQ in an uncompensated state as it is, the second predicted charge amount Qm has little abrupt change, etc. Therefore, in extracting the change rate Qm_rate of charge amount, the second predicted charge amount Qm may be more appropriate than the first predicted charge amount Qe.

The first compensator 321 may calculate the fourth charge variation ΔQ_track on the basis of the predicted open circuit voltage OCVe and the battery voltage Vm, as described above. The first compensator 321 may operate when the magnitude of the battery current Im is less than the first threshold value.

According to an embodiment, the first compensator 321 may calculate a value of the fourth charge variation ΔQ_track differently according to the size of the level of the battery voltage Vm and the predicted open circuit voltage OCVe. For example, when the battery voltage Vm is greater than the predicted open circuit voltage OCVe, as shown in Equation 6, the fourth charge variation ΔQ_track may be set to '0' to prevent the predicted open circuit voltage OCVe from changing, and when the battery voltage Vm is less than the predicted open circuit voltage OCVe, the fourth charge variation ΔQ_track may be calculated as in Equation 7 to allow the predicted open circuit voltage OCVe to track the battery voltage Vm.

$$\Delta Q\_track = \begin{cases} 0, & \text{if } Vm \geq OCVe \\ (Vm - OCVe) \cdot C1, & \text{if } Vm < OCVe \end{cases} \quad \text{[Equation 6]}$$

The reason for setting the fourth charge variation ΔQ_track to '0' in Equation 6 when the battery voltage Vm is greater than the predicted open circuit voltage OCVe is to prevent a problem, in which, when the predicted open circuit voltage OCVe is increased by giving a positive value to the fourth charge variation ΔQ_track, the first predicted charge amount Qe and the state of charge calculated by it increase in a situation in which the battery is maintained in a discharged state, from occurring.

In addition, in Equation 6, the first constant C1 is a constant that affects the speed at which the predicted open circuit voltage OCVe tracks the battery terminal voltage Vm, and the predicted open circuit voltage OCVe may be made to gradually track the battery terminal voltage Vm by appropriately setting the first constant C1. According to an embodiment, the first constant C1 is set on the basis of the internal resistance R value of the battery, so that the predicted open circuit voltage OCVe may be made to track the battery terminal voltage Vm at a speed matching the time constant of the battery.

As described above, the second compensator 322 may calculate the second charge variation ΔQ_comp by compensating for the first charge variation ΔQ so that the difference between the first overpotential predicted value Vds_e and the first overpotential reference value Vds_ref decreases when the magnitude of the battery current Im is greater than a second threshold value. To this end, the second compensator 322 may calculate the charge variation compensation coefficient comp_rate by selectively using the predicted open circuit voltage OCVe obtained using the first lookup table 325, the internal resistance R and the second overpotential Vov obtained using the second lookup table 326, and the second predicted charge quantity Qm obtained using the third coulomb counter 327, and the battery voltage Vm, and the current Im. The charge variation compensation coefficient comp_rate calculated by the second compensator 322 may be multiplied by the first charge variation ΔQ to be utilized to calculate the second charge variation ΔQ_comp.

According to the embodiment, the second compensator 322 may set the charge variation compensation coefficient comp_rate to 1 when the first overpotential predicted value Vds_e is less than the first overpotential reference value Vds_ref. When the first overpotential predicted value Vds_e is less than the first overpotential reference value Vds_ref, the full charge capacity is increased from the design capacity, which may occur at a high temperature, etc., but the difference is generally not large and is negligible. In addition, even if a slight aging progresses, a decrease in the full charge capacity due to aging offsets the increase in the full charge capacity due to the high temperature, and thus compensation for a case where the first predicted overpotential value Vds_e is less than the first overpotential reference value Vds_ref may be omitted. According to this method, a compensation algorithm can be simplified and power consumption of the compensator can be reduced.

According to the embodiment, when the first overpotential predicted value Vds_e is greater than the first overpotential reference value, the second compensator 322 may increase the charge variation compensation coefficient comp_rate as the first overpotential rate Vds_rate increases. Here, the first overpotential rate Vds_rate may be proportional to an absolute value of a value obtained by dividing the first overpotential predicted value Vds_e by the first overpotential reference value Vds_ref (see Equation 9). According to this method, there is an advantage in that, as the first overpotential predicted value Vds_e increases (that is, as the decrease in the full charge capacity increases), the charge variation compensation coefficient comp_rate is increased so that the compensator 320 reflects changes in the full charge capacity more, thereby increasing the accuracy of the state of charge estimation.

According to the embodiment, when the first overpotential predicted value Vds_e is greater than the first overpotential reference value Vds_ref, the second compensator 322 may increase the charge variation compensation coefficient comp_rate as the charge change rate Qm_rate increases. Here, the charge change rate Qm_rate may be determined on the basis of the change rate of the second predicted charge amount Qm. According to this method, there is an advantage in that, as the recent change in the amount of charge increases, the charge change compensation coefficient comp_rate is increased to reflect changes in the charge capacity more, thereby increasing the accuracy of the state of charge estimation.

According to the embodiment, when the magnitude of the battery current Im is greater than the second threshold value, the second compensator 322 may calculate the charge variation compensation coefficient comp_rate through the process of Equations 7 to 12 below, but Equations 7 to 12 are only examples, and the present embodiment is not limited thereto.

$$Vds\_ref(n) = R(n) \cdot Im(n) + Vov(n) \quad \text{[Equation 7]}$$

$$Vds\_e(n) = Vm(n) - OCVe(n) \quad \text{[Equation 8]}$$

$$Vds\_rate(n) = \left| \frac{Vds\_e(n)}{Vds\_ref(n)} \right| \quad \text{[Equation 9]}$$

$$Qm\_rate(n) = 1 + \left| 1 - \frac{Qm(n)}{Qm(n-T)} \right| \quad \text{[Equation 10]}$$

$$SF(n) = C2 \cdot \left( \frac{Qe(n)}{Q\_max} - C3 \right)^{C4} \quad \text{[Equation 11]}$$

comp_rate($n$)=Qm_rate($n$)·{1+SF($n$)·Vds_rate($n$)}  [Equation 12]

C2, C3, C4, etc., which are constants used in Equations 10 to 12, may be appropriately set according to circumstances. In Equation 10, Qm(n−T) is the previous T-th second predicted charge amount Qm. For example, when T=10 is set, the charge change rate Qm_rate may be calculated using the degree of change between the previous tenth second predicted variation (Qm(n−10)) and the current second predicted variation (Qm(n)). In Equation 11, Q_max is the maximum amount of charge, and the smoothing factor (SF) may be understood as a value used for smooth change of the charge variation compensation coefficient comp_rate.

As such, the second compensator 322 may increase the charge change compensation coefficient comp_rate as the first overpotential rate Vds_rate increases. In addition, the second compensator 322 may increase the charge variation compensation coefficient comp_rate as the charge change rate Qm_rate increases. Through this, the second compensator 322 can effectively reflect the change in the full charge capacity to increase the accuracy of the state of charge estimation.

Figure 4:
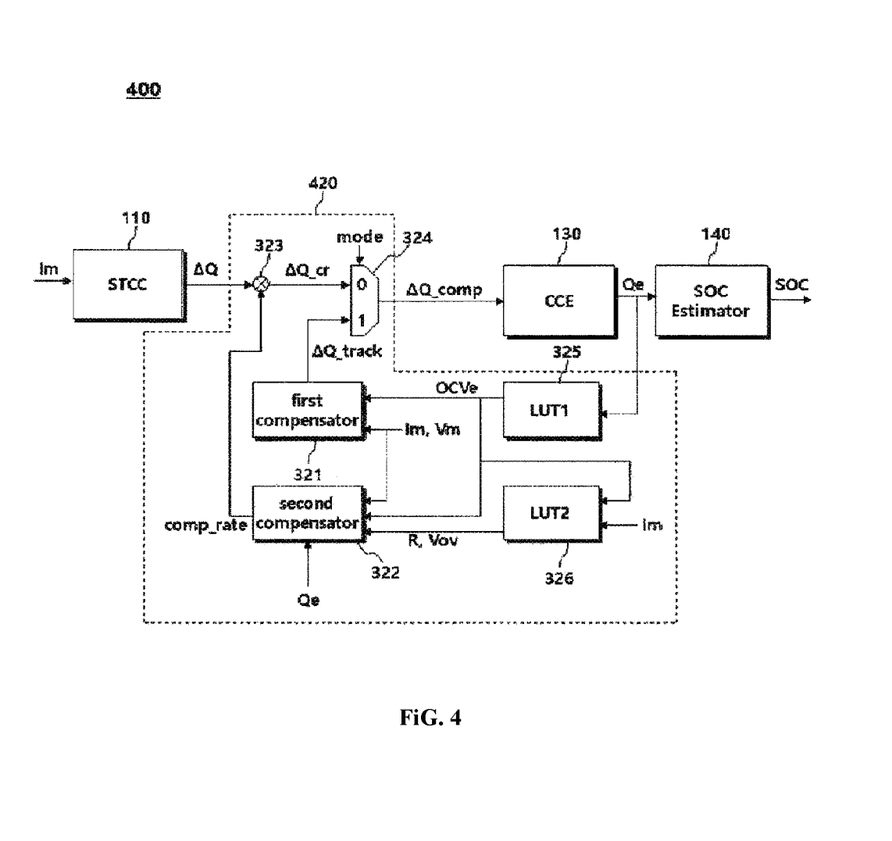
FIG. 4 illustrates an apparatus for estimating a state of charge of a battery according to still yet another embodiment of the present invention.

FIG. 4 illustrates an apparatus 400 for estimating a state of charge of a battery according to still another embodiment of the present invention.

The apparatus 400 for estimating the state of charge of the battery illustrated in FIG. 4 is different from the apparatus 300 for estimating the state of charge of the battery illustrated in FIG. 3 in that the third coulomb counter 327 is not used. Since the third coulomb counter 327 is not used in the apparatus 400 for estimating the state of charge of the battery, the second predicted charge amount Qm is not calculated. The second compensator 322 may calculate the charge variation compensation coefficient comp_rate by using the first predicted charge amount Qe instead of the second predicted charge amount Qm. For example, when calculating the change rate Qm_rate of the amount of charge in Equation 11, the first predicted charge amount Qe may be used instead of the second predicted charge amount Qm. According to the apparatus 400 for estimating the state of charge of the battery illustrated in FIG. 4, since the third coulomb counter 327 is not used, there is an advantage in that the compensator 420 can be implemented more simply and power consumption is reduced.

Figure 5:
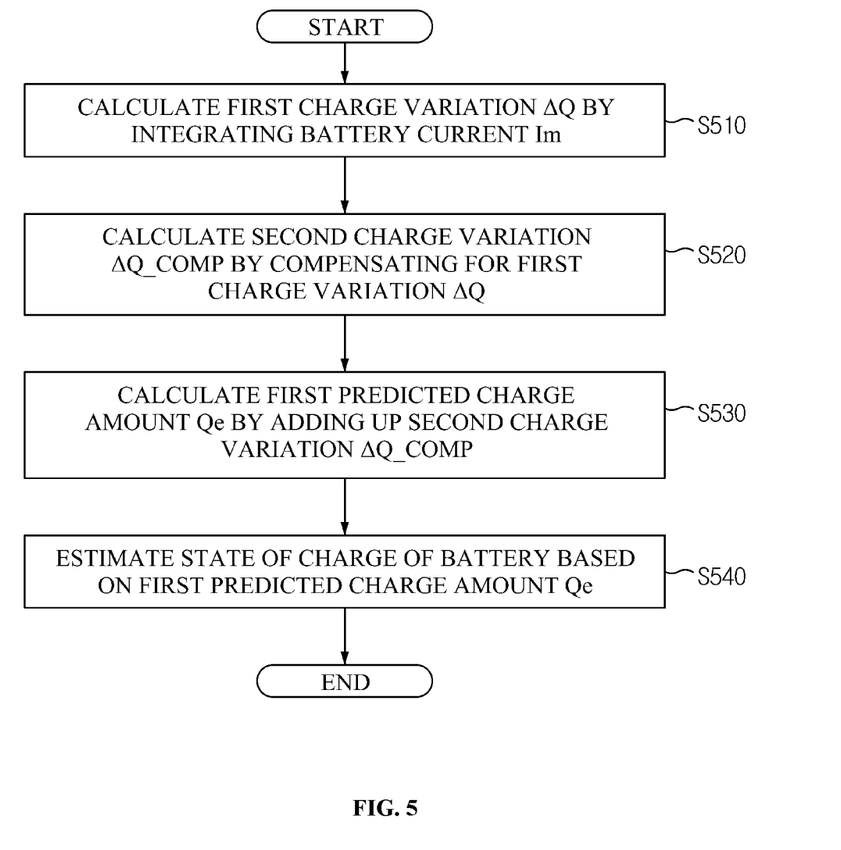
FIG. 5 illustrates a method for estimating a state of charge of a battery according to an embodiment of the present invention.

FIG. 5 illustrates a method of estimating a state of charge of a battery according to an embodiment of the present invention. The method of estimating the state of charge of the battery illustrated in FIG. 5 may be performed by the apparatus for estimating the state of charge of the battery illustrated with reference to FIGS. 1 to 4.

Referring to FIG. 5, a step S510 of calculating the first charge variation ΔQ by adding up the battery current Im, a step S520 of calculating the second charge variation ΔQ_comp by compensating for the first charge variation ΔQ, a step S530 of calculating the first predicted charge amount Qe by adding up the second charge variation ΔQ_comp, and a step S540 of estimating the state of charge of the battery on the basis of the first predicted charge amount Qe may be sequentially performed.

According to an embodiment, in step S520 of calculating of the second charge variation ΔQ_comp by compensating for the first charge variation ΔQ, the predicted open circuit voltage OCVe may be calculated using the first predicted charge amount Qe, and the second charge variation ΔQ_comp may be calculated by compensating for the first charge variation using the predicted open circuit voltage OCVe.

Figure 6:
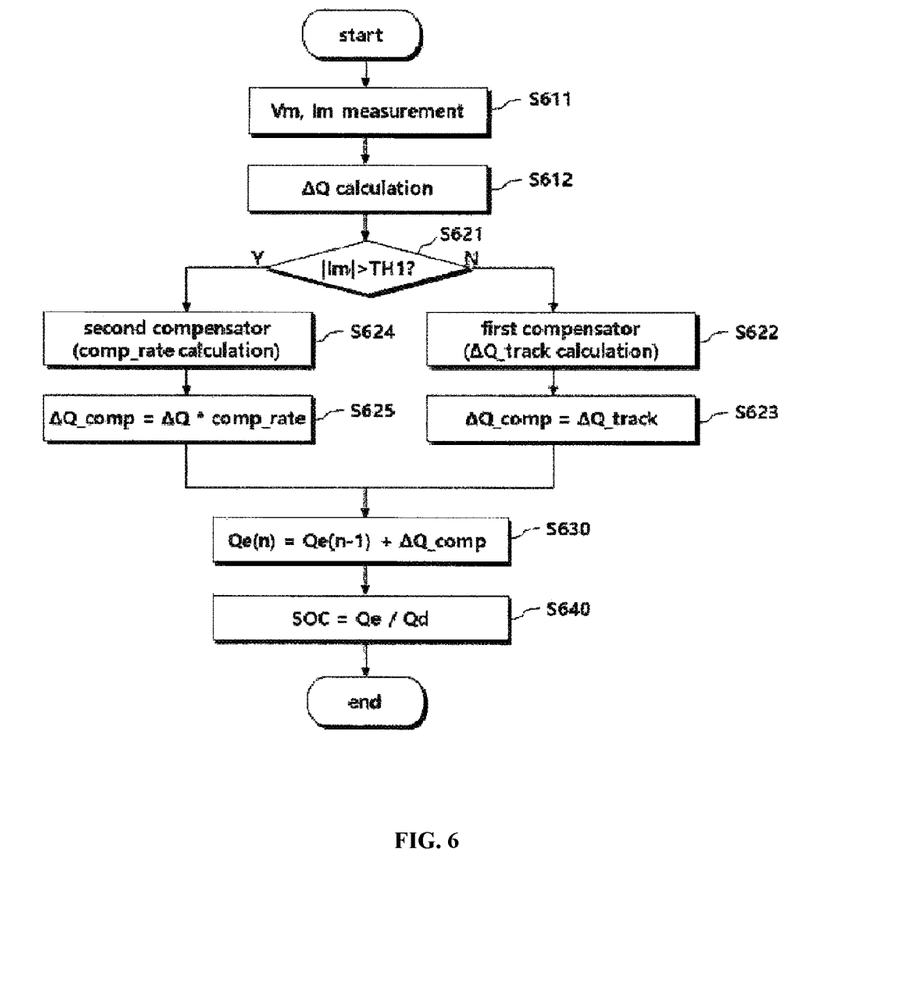
FIG. 6 illustrates a method for estimating a state of charge of a battery according to another embodiment of the present invention.

FIG. 6 illustrates a method of estimating a state of charge of a battery according to another embodiment of the present invention. The method of estimating the state of charge of the battery illustrated in FIG. 6 may be performed by the apparatus for estimating the state of charge of the battery illustrated with reference to FIGS. 1 to 4.

First, the battery voltage Vm and battery current Im information may be obtained (S611). A conventional current detection means such as a current detection resistor or a current transformer may be used to detect the battery current Im, but is not limited thereto.

As step S612, the first charge variation ΔQ may be calculated. Calculation of the first charge variation ΔQ may be performed by the first coulomb counter 110 described above.

Steps S611 and S612 may correspond to steps S510 of FIG. 5.

Next, the magnitude of the battery current Im is compared with the first threshold value TH1 (S621). When the magnitude of the battery current Im is greater than the first threshold value TH1, the process may proceed to step S624, and when the level of the battery current Im is less than the first threshold value TH1, the process may proceed to step S622.

When the magnitude of the battery current Im is less than the first threshold value TH1, the fourth charge variation ΔQ track may be calculated in step S622, and the second charge variation ΔQ_comp may be calculated using the fourth charge variation ΔQ track in step S623. Steps S622 and S623 may be performed by the first compensator. As for the detailed calculation method of the fourth charge variation ΔQ track and the second charge variation ΔQ_comp, the contents described above with respect to the first compensator may be applied.

When the magnitude of the battery current Im is greater than the first threshold value TH1, the charge variation compensation coefficient comp_rate may be calculated in step S624, and the second charge variation ΔQ_comp may be calculated using the charge variation compensation factor comp_rate in step S625. Steps S624 and S625 may be performed by the second compensator. As for the detailed calculation method of the charge variation compensation coefficient comp_rate and the second charge variation ΔQ_comp, the contents described above with respect to the first compensator may be applied.

Steps S621 to S625 may correspond to steps S520 of FIG. 5.

Next, as step S630, the first predicted charge amount Qe may be calculated by adding up the second charge variation ΔQ_comp compensated through step S623 or S625. Step S630 may be performed by the second coulomb counter described above.

Next, as step S640, the state of charge of the battery may be estimated on the basis of the first predicted charge amount Qe. The state of charge SOC may be used as the state of charge of the battery, and the SOC may be calculated on the basis of a value obtained by dividing the first predicted charge amount Qe by the design capacity Qd.

Figure 7:
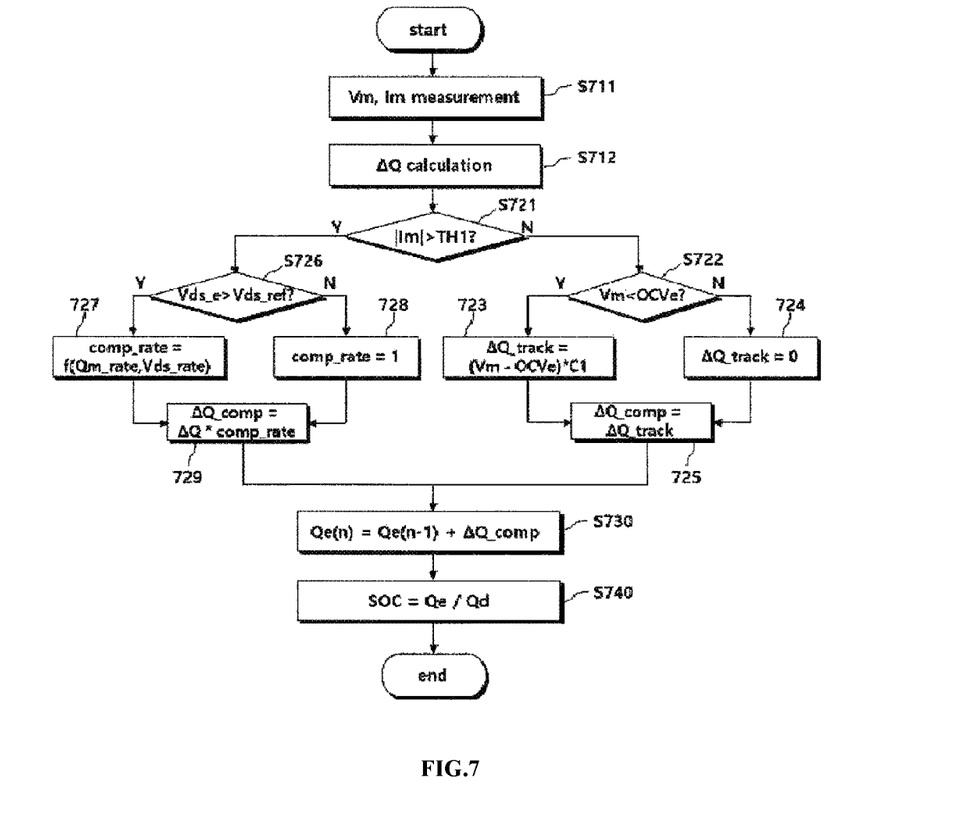
FIG. 7 illustrates a method for estimating a state of charge of a battery according to still another embodiment of the present invention.

FIG. 7 illustrates a method of estimating a state of charge of a battery according to another embodiment of the present invention. FIG. 7 illustrates steps S622 to S625 of FIG. 6 in more detail.

First, steps S622 and S623 of FIG. 6 may be changed to steps S722 to S725 of FIG. 7.

In step S722, it may be determined whether or not the battery voltage Vm is less than the predicted open circuit voltage OCVe. When it is determined that the battery voltage Vm is less than the predicted open circuit voltage OCVe, the process may proceed to step S723, otherwise, the process may proceed to step S724.

When the battery voltage Vm is less than the predicted open circuit voltage OCVe, in step S723, the fourth charge variation ΔQ track may be calculated using the method of Equation 6 described above. In this case, the accumulation error due to the coulomb counter may be reduced by the predicted open circuit voltage OCVe tracking the battery voltage Vm.

When the battery voltage Vm is greater than the predicted open circuit voltage OCVe, in step S724, the fourth charge variation ΔQ track is set to '0', so that the predicted open circuit voltage OCVe may not be changed.

Next, steps S624 and S625 of FIG. 6 may be changed to steps S726 to S729 of FIG. 7.

In step S726, it may be determined whether or not the first overpotential predicted value Vds_e is greater than the first overpotential reference value Vds_ref. When it is determined that the first overpotential predicted value Vds_e is greater than the first overpotential reference value Vds_ref, the process may proceed to step S727, otherwise, the process may proceed to step S728.

When the first overpotential predicted value Vds_e is greater than the first overpotential reference value Vds_ref, in step S727, the charge variation compensation coefficient comp_rate may be calculated using the methods of Equations 7 to 12 described above. In this case, according to an embodiment, as the first overpotential rate Vds_rate increases, the charge variation compensation coefficient comp_rate may increase. In addition, according to an embodiment, as the charge change rate Qm_rate increases, the charge variation compensation coefficient comp_rate may increase. Through this, it is possible to effectively reflect the change in the full charge capacity to increase the accuracy of the state of charge estimation.

When the first overpotential predicted value Vds_e is not greater than the first overpotential reference value Vds_ref, in step S728, the charge variation compensation coefficient comp_rate may be set to '1'. That is, when the first predicted overpotential value Vds_e is not greater than the first overpotential reference value Vds_ref, the second charge variation ΔQ_comp may be the same as the first charge variation ΔQ.

According to an embodiment, the apparatus for estimating the state of charge of the battery described above may perform its function by an operation unit such as a CPU while being implemented as software and stored in a computer-readable storage medium (memory, etc.). In this case, components inside the apparatus for estimating the state of charge of the battery may be distinguished from each other by being respectively implemented as a separate module inside the software implementing the apparatus for estimating the state of charge of the battery, but in some cases, the respective components may be implemented in a state where functions thereof are mixed inside the software without distinction. According to an embodiment, the apparatus for estimating the state of charge of the battery may be implemented in hardware such as an application specific integrated circuit (ASIC), a field programmable gate array (FPGA), etc.

Terms such as "includes", "comprises" or "have" described above, unless otherwise stated to the contrary, mean that the corresponding component may be embedded, and thus, the term should be construed as being able to further include other components rather than excluding other components. All terms including technical and scientific terms, unless otherwise defined, have the same meaning as commonly understood by a person ordinary skilled in the art to which the present invention pertains. Terms commonly used, such as those defined in the dictionary, should be construed as being consistent with the meaning of the context of the related art, and should not be construed in an ideal or excessively formal meaning unless explicitly defined in the present invention.

The above description is merely illustrative of the technical idea of the present invention, and a person ordinary skilled in the art to which the present invention pertains will be able to make various modifications and variations thereto without departing from the essential characteristics of the present invention. Accordingly, the embodiments disclosed in the present invention are intended to describe, not to limit the technical spirit of the present invention, and the scope of the technical spirit of the present invention is not limited by these embodiments. The protection scope of the present invention should be construed by the tracking claims, and all technical ideas within the scope equivalent thereto should be construed as being included in the scope of right of the present invention.

The invention claimed is:

1. An apparatus for estimating a state of charge of a battery, comprising:
   a first coulomb counter STCC circuit for sampling a first charge variation ΔQ on the battery in a time comprising a number of predetermined periods, wherein the first charge variation ΔQ is calculated by adding up a battery current Im in each of the number of predetermined periods;
   a compensator circuit that compensates for effects of battery aging and temperature including calculating a second charge variation ΔQ_comp in said time by compensating for the first charge variation ΔQ on the battery according to a first overpotential reference value Vds_ref, which is calculated using an internal resistance R and a second overpotential Vov of the battery obtained through an experiment on an unaged battery at room temperature;
   a second coulomb counter CCE circuit for calculating a first predicted charge amount Qe by adding up the second charge variation ΔQ_comp; and
   a state of charge estimator circuit for estimating the state of charge of the battery based on the first predicted charge amount Qe.

2. The apparatus of claim 1, wherein
   the compensator circuit calculates a predicted open circuit voltage OCVe by using the first predicted charge amount Qe, and calculates the second charge variation ΔQ_comp by using the predicted open circuit voltage OCVe.

3. The apparatus of claim 2, wherein
   the compensator circuit calculates the second charge variation ΔQ_comp by compensating for the first charge variation ΔQ so that a difference between the predicted open circuit voltage OCVe and a battery terminal voltage Vm decreases when a magnitude of the battery current Im is less than a first threshold value.

4. The apparatus of claim 3, wherein
   the second charge variation ΔQ_comp is calculated by subtracting the predicted open circuit voltage OCVe from the battery terminal voltage Vm, then multiplying with a first constant C1.

5. The apparatus of claim 4, wherein
   the first constant C1 is predetermined on based on an internal resistance value R of the battery.

6. The apparatus of claim 2, wherein
the compensator circuit calculates the second charge variation ΔQ_comp by compensating for the first charge variation ΔQ so that a difference between a first overpotential predicted value Vds_e and the first overpotential reference value Vds_ref decreases when a magnitude of the battery current Im is greater than a second threshold value.

7. The apparatus of claim 6, wherein
the first overpotential predicted value Vds_e is calculated on a basis of a value obtained by subtracting the predicted open circuit voltage OCVe from the battery terminal voltage Vm, and the first overpotential reference value Vds_ref is calculated using a second lookup table LUT2 comprising information about the internal resistance R and the second overpotential Vov of the battery.

8. The apparatus of claim 7, wherein
the information about the internal resistance R and the second overpotential Vov of the battery in the second lookup table LUT2 is data obtained through the experiment of the unaged battery at room temperature by applying an intermittent constant current pulse at room temperature to the unaged battery.

9. The apparatus of claim 6, wherein
the compensator circuit calculates a charge variation compensation coefficient comp_rate, and calculates the second charge variation ΔQ_comp by multiplying the charge variation compensation coefficient comp_rate by the first charge variation ΔQ.

10. The apparatus of claim 9, wherein
when the first overpotential predicted value Vds_e is less than the first overpotential reference value Vds_ref, the charge variation compensation coefficient comp_rate is set to 1.

11. The apparatus of claim 9, wherein
when the first overpotential predicted value Vds_e is greater than the first overpotential reference value Vds_ref, as a first overpotential rate Vds_rate increases, the charge variation compensation coefficient comp_rate also increases.

12. The apparatus of claim 11, wherein
the first overpotential rate Vds_rate is proportional to a value obtained by dividing the first overpotential predicted value Vds_e by the first overpotential reference value Vds_ref.

13. The apparatus of claim 9, wherein
when the first overpotential predicted value Vds_e is greater than the first overpotential reference value Vds_ref, as a charge change rate Qm_rate increases, the charge variation compensation coefficient comp_rate increases.

14. The apparatus of claim 13,
wherein the compensator circuit further includes a third coulomb counter CCM for calculating a second predicted charge amount Qm by adding up the first charge variation ΔQ; and
wherein the charge change rate Qm_rate is determined on a basis of a change rate of the second predicted charge amount Qm.

15. A method for estimating a state of charge of a battery, wherein the method comprises:
calculating, by a first coulomb counter STCC circuit, a first charge variation ΔQ on the battery in a time comprising a number of predetermined periods, by adding up a battery current Im in each of the predetermined periods;
obtaining an internal resistance R and a second overpotential Vov of the battery through an experiment on an unaged battery at room temperature;
compensating for effects of battery aging and temperature, by a compensator circuit, including calculating a second charge variation ΔQ_comp in said time by compensating for the first charge variation ΔQ on the battery according to a first overpotential reference value Vds_ref, which is calculated using the internal resistance R and the second overpotential Vov of the battery obtained;
calculating, by a compensator circuit, a second charge variation ΔQ_comp by compensating for the first charge variation ΔQ;
calculating, by a second coulomb counter CCE circuit, a first predicted charge amount Qe by adding up the second charge variation ΔQ_comp; and
estimating, by a state of charge estimator circuit, the state of charge of the battery on a basis of the first predicted charge amount Qe.

16. The method of claim 15, wherein
in the calculating of the second charge variation ΔQ_comp by compensating for the first charge variation ΔQ, a predicted open circuit voltage OCVe is calculated using the first predicted charge amount Qe, and the second charge variation ΔQ_comp is calculated by compensating for the first charge variation ΔQ using the predicted open circuit voltage OCVe.

17. The method of claim 16, wherein
in the calculating of the second charge variation ΔQ_comp by compensating for the first charge variation ΔQ, the second charge variation ΔQ_comp is calculated by compensating for the first charge variation ΔQ so that a difference between the predicted open circuit voltage OCVe and a battery terminal voltage Vm decreases when a magnitude of the battery current Im is less than a first threshold value.

18. The method of claim 17, wherein
the second charge variation ΔQ_comp is calculated on the basis of a value obtained by multiplying a value, which is obtained by subtracting the predicted open circuit voltage OCVe from the battery terminal voltage Vm, by a first constant C1.

19. The method of claim 15, wherein
in the calculating of the second charge variation ΔQ_comp by compensating for the first charge variation ΔQ, the second charge variation ΔQ_comp is calculated by compensating for the first charge variation ΔQ so that a difference between a first overpotential predicted value Vds_e and a first overpotential reference value Vds_ref decreases when a magnitude of the battery current Im is greater than a second threshold value.

* * * * *